(12) United States Patent
Hong

(10) Patent No.: US 8,906,139 B2
(45) Date of Patent: Dec. 9, 2014

(54) METHOD FOR SELECTIVELY ISOLATING HYDROGEN OR HELIUM USING A NATROLITE-BASED ZEOLITE, AND NOVEL NATROLITE-BASED ZEOLITE

(75) Inventor: Suk Bong Hong, Gyungbuk (KR)

(73) Assignee: Postech Academy-Industry Foundation, Gyungbuk (KR)

( * ) Notice: Subject to any disclaimer, the term of this patent is extended or adjusted under 35 U.S.C. 154(b) by 704 days.

(21) Appl. No.: 13/148,078

(22) PCT Filed: Sep. 21, 2009

(86) PCT No.: PCT/KR2009/005350
§ 371 (c)(1),
(2), (4) Date: Sep. 6, 2011

(87) PCT Pub. No.: WO2010/090386
PCT Pub. Date: Aug. 12, 2010

(65) Prior Publication Data
US 2011/0308385 A1    Dec. 22, 2011

(30) Foreign Application Priority Data

Feb. 6, 2009    (KR) ........................ 10-2009-0009716
Sep. 10, 2009    (KR) ........................ 10-2009-0085610

(51) Int. Cl.
*B01D 53/047*    (2006.01)
*B01D 53/02*    (2006.01)
*B01J 20/10*    (2006.01)
*C01B 3/50*    (2006.01)
*C01B 23/00*    (2006.01)
*B01J 20/18*    (2006.01)
*C01B 39/08*    (2006.01)

(52) U.S. Cl.
CPC ............ *B01D 53/02* (2013.01); *B01D 2256/16* (2013.01); *B01J 20/10* (2013.01); *B01D 53/047* (2013.01); *Y02E 60/364* (2013.01); *B01D 2253/108* (2013.01); *C01B 3/508* (2013.01); *C01B 23/0068* (2013.01); *B01J 20/18* (2013.01); *C01B 39/082* (2013.01); *C01B 2210/0053* (2013.01); *B01D 2256/18* (2013.01)

USPC ............ 95/116; 95/45; 95/90; 95/96; 95/127; 423/700; 423/718

(58) Field of Classification Search
CPC ..................... B01D 2253/108; B01D 2256/16; B01D 2256/18; B01D 53/02; B01D 53/047; B01J 20/10; B01J 20/18; C01B 2210/0031; C01B 2210/0053; C01B 23/0068; C01B 39/082; C01B 3/508; Y02E 60/364
USPC ........... 95/45, 90, 96, 116, 127; 423/700, 718
See application file for complete search history.

(56) References Cited

U.S. PATENT DOCUMENTS 3,772,852 A * 11/1973 Tamura et al. ................. 95/126
3,808,773 A    5/1974 Reyhing et al.
(Continued)

FOREIGN PATENT DOCUMENTS

EP    1 148 025    10/2001
EP    1 275 430    1/2003
(Continued)

OTHER PUBLICATIONS

Cho, H. H., et al., Synthesis and characterization of gallosilicate molecular sieves with high gallium contents: examples of structure direction exerted by gallium, Chem. Mater., 2000, 12:, pp. 2292-2300.
(Continued)

*Primary Examiner* — Christopher P Jones
(74) *Attorney, Agent, or Firm* — Thompson Hine LLP

(57) ABSTRACT

The present invention relates to selectively isolating gases using a natrolite-based zeolite, and more particularly, to a novel natrolite-based zeolite and to selectively isolating hydrogen and/or helium gas using a natrolite-based zeolite. The present invention is characterized in that gas containing hydrogen is brought into contact with a natrolite-based zeolite to selectively isolate the hydrogen. The present invention provides a sorbent which can selectively isolate hydrogen and/or helium, and provides a method for isolating the hydrogen and/or helium at room temperature or at a high temperature.

12 Claims, 5 Drawing Sheets

(56) References Cited

U.S. PATENT DOCUMENTS

| | | | |
|---|---|---|---|
| 4,803,060 | A | 2/1989 | Occelli |
| 5,466,432 | A | 11/1995 | Wallau et al. |
| 2004/0115269 | A1* | 6/2004 | Vogt et al. .................. 424/484 |
| 2007/0157810 | A1* | 7/2007 | England .................... 95/285 |
| 2010/0047161 | A1* | 2/2010 | Latturner et al. ............ 423/713 |
| 2011/0247495 | A1* | 10/2011 | Marco et al. .................. 95/127 |

FOREIGN PATENT DOCUMENTS

| | | |
|---|---|---|
| JP | 63-305924 | 12/1988 |
| JP | 11-40211 | 2/1999 |
| KR | 10-2001-0018274 | 3/2001 |
| WO | 99/65873 | 12/1999 |

OTHER PUBLICATIONS

Hong, S. B., et al., In situ disorder-order transformation in synthetic gallosilicate zeolites with the NAT topology, J.Am.Chem.Soc., 2004, 126:, pp. 13742-13751.

International Search Report, completion date of May 17, 2010; mailing date of May 24, 2010.

Shin, J., et al., PST-1: A synthetic small-pore zeolite that selectively adsorbs $H_2$, Angewandte Chemie Ind. Ed. 2009, vol. 48, pp. 1-4.

Supplementary European Search Report, EP09839753, completed Dec. 11, 2013, 6 pages.

Xie et al. Synthesis and Structural Characterization of a Hydrated Gallosilicate Zeolite With the Nat-Framework. Met. Res. Soc. Symp. Proc. 111 (1988) 147-154.

Lee et al. Dehydration-Induced Water Disordering in a Synthetic Potassium Gallosilicate Natrolite. J. Am. Chem. Soc. 129 (2007) 13744-13748.

Hong et al. In Situ Disorder—Order Transformation in Synthetic Gallosilicate Zeolites with the NAT Topology. J. Am. Chem. Soc. 126 (2004) 13742-13751.

* cited by examiner

METHOD FOR SELECTIVELY ISOLATING HYDROGEN OR HELIUM USING A NATROLITE-BASED ZEOLITE, AND NOVEL NATROLITE-BASED ZEOLITE

PRIORITY CLAIM

This application is a National Phase of PCT/KR2009/005350 filed Sep. 21, 2009, which claims priority to Korean Patent Application No. 10-2009-0009716 filed Feb. 6, 2009 and Korean Patent Application No. 10-2009-0085610 filed Sep. 10, 2009.

TECHNICAL FIELD

The present invention relates to a novel natrolite-based zeolite and the selective separation of gases using the same, and more particularly to a process of selectively separating hydrogen or helium using a natrolite-based zeolite.

BACKGROUND ART

Molecular sieves, including zeolites, have very small pores, the size of which is uniform within a variation of 0.1 Å and the shape of which varies depending on the framework structure of the molecular sieves, and thus these molecular sieves show unique shape-selective properties which are not observed in amorphous oxides. Accordingly, these nanoporous materials have been used as ion exchangers, separating agents, catalysts or catalyst supports, in the fine chemical industry, the petrochemical industry, and the like [Kirk Othmer Encyclo. Chem. Technol., 1996, Vol. 16, pp. 888]. The successful use of such nanoporous materials can be because new zeolites whose framework structures or compositions differ from those of existing materials have been continuously developed for several years, thus making it possible to significantly improve many commercially important chemical processes. Gallosilicate zeolites comprising gallium and silicon as framework elements have physicochemical and catalytic properties different from those of aluminosilicate zeolite [Oil Gas J., 1985, Vol. 83, pp. 1288], and thus studies on the synthesis thereof have been actively conducted, and more than 20 types of gallosilicate zeolites having different framework structures have been reported to date [Chem. Rev. 2000, Vol. 100, pp. 2303].

Accordingly, the present inventor has conducted many studies to synthesize a molecular sieve having a framework structure and composition different from those of known zeolites and molecular sieves. As a result, the present inventor has discovered one type of gallosilicate zeolite having a novel composition and has found that this type of zeolite has a significant effect on gas adsorption.

High-purity hydrogen can be used in almost all fields, including industrial basic materials and current energy systems such as general fuels, semiconductors and fuel cells, and thus has received attention as a next-generation energy source that can substitute for existing energy systems based on electricity and gases. In order to achieve a hydrogen energy system different from existing energy systems, a technology for producing large amounts of hydrogen should be provided, because the hydrogen energy system should be used in commercial and domestic applications in addition to existing industrial applications. In long-term economic terms, the production cost of hydrogen should be lower than the production cost of fossil fuels. Known methods for producing large amounts of hydrogen include: (1) a method of producing hydrogen by electrolysis of water, and (2) a method of producing hydrogen by steam reforming. The electrolysis method (1) will not be cost-effective if high power is used, because the production costs of the products (hydrogen and oxygen) greatly depends on the amount of power. For this reason, studies on systems, which produce inexpensive power by renewable energy such as wind force or solar energy and produce hydrogen by electrolysis using the produced power, have recently been conducted, but such systems are difficult to use in practice due to many technical problems. Thus, under current circumstances, the steam reforming method (2) is the most suitable method for producing large amounts of hydrogen. The steam reforming method is a method of obtaining hydrogen gas from natural gas and heavy naphtha which is a byproduct of an oil refining process. In the steam reforming process, such hydrocarbons are converted into synthesis gases, such as CO, $CO_2$ and $H_2$, by allowing them to react with steam at a high temperature of about 800° C. using nickel oxide as a catalyst. Herein, the obtained synthesis gases are treated by a gas separation process depending on the intended use thereof. In order to obtain high-purity hydrogen, CO among the synthesis gases obtained by the reforming process is separated into $CO_2$ and $H_2$ by a shift conversion reaction, after which $CO_2$ is separated and $H_2$ is separated and purified from impurities (such as CO, $H_2O$, $CH_4$, etc.) remaining in the reaction system.

Typical processes for the separation and purification of hydrogen include a pressure swing adsorption (PSA) process and a membrane separation process. In the pressure swing adsorption process, raw material gas is passed through an adsorption column packed with an adsorbent under high pressure, while components with high selectivity are adsorbed onto the adsorbent, and desired components with low selectivity are discharged from the adsorption column. However, in this process, an equilibrium reaction occurs at a high temperature of about 800° C., a large-scale complicated system is used, the number of treatment processes and apparatuses is increased, a high installation cost is required, and the maintenance and repair of apparatuses are difficult. In addition, high-purity hydrogen is not obtained, thus making it difficult to provide a sufficient amount of high-purity hydrogen. Meanwhile, the membrane separation processes which are currently used in practice mostly perform the separation and purification of hydrogen through a Pd—Ag alloy membrane, a hydrogen-permeable alloy membrane. However, Pd is expensive and is not abundant in nature, and thus the development of a material to substitute for Pd is requested.

Meanwhile, processes of separating gases from each other using zeolites have been attempted. Zeolite is crystalline, and thus has a uniform structure and a uniform pore size and shape. The pore opening size of zeolite is primarily determined according to the framework structure, also varies depending on the kind and degree of exchange of cations. Among the selective adsorption properties of zeolite, the most important is that a material larger than the pore opening cannot enter the pore so that it is not adsorbed onto zeolite. Different gases have different molecular sizes, and different zeolites also have different pore opening sizes. Thus, when zeolite is suitably selected, it can separate a gas mixture into components according to molecular size. Also, due to the energy interaction between cations and polar or polarizable adsorbents, these adsorbents are adsorbed with a mixture of chemical species having low polarity or polarizability. This molecular sieve effect is an inherent property which appears because zeolite is a crystalline material and has a pore size similar to the molecular size thereof, and this molecular sieve effect is effectively used in the separation and purification field. However, a zeolite that selectively adsorbs hydrogen gas has not yet been found.

DISCLOSURE OF INVENTION

Technical Problem

It is an object of the present invention to provide a novel porous gallosilicate material whose content of positive trivalent framework elements (particularly gallium) is higher than those of known zeolites having the natrolite structure.

Another object of the present invention is to provide a method for preparing a novel porous gallosilicate.

Still another object of the present invention is to provide the use of a novel porous gallosilicate as either an ion exchanger or an adsorbent for selectively adsorbing small gaseous molecules such as hydrogen from gas mixtures.

Still another object of the present invention is to provide a process of selectively separating high-purity hydrogen and/or high-purity helium from a gas mixture by adsorption using a novel zeolite in a more economical manner.

Technical Solution

To achieve the above objects, the present invention provides a process of selectively separating hydrogen and/or helium from a gas mixture containing hydrogen and/or helium, the process comprising bringing the gas mixture into contact with a natrolite-based zeolite.

In the present invention, the natrolite-based zeolite is prepared using a mixture comprising a source of an alkali metal or alkaline earth metal (M), an oxide of a trivalent element (X), an oxide of a tetravalent element (Y), and water, in which the mixture has the following molar ratio composition:

$$YO_2/X_2O_3 = 0.5~100; \quad (i)$$

$$H_2O/YO_2 = 1~100; \text{ and} \quad (ii)$$

$$M_2O/YO_2 = 0.1~10. \quad (iii)$$

In an embodiment of the present invention, the alkali metal or alkaline earth metal may be selected from among, for example, Li, Na, K, Ru, Mg and Ca. Also, the trivalent element (X) comprises gallium or aluminum, preferably gallium, and the tetravalent element (Y) comprises silicon.

In an embodiment of the present invention, the natrolite-based zeolite can be obtained by providing a novel gallosilicate PST-1 (POSTECH number 1) zeolite having a framework structure consisting of oxides having a molar ratio shown in the following formula (1), the novel gallosilicate PST-1 zeolite showing X-ray diffraction peak patterns shown in Table 1 below:

$$1.0K_2O : 1.0Ga_2O_3 : 2.3~2.7SiO_2 \quad (1)$$

TABLE 1

| 2θ | D | 100 × I/I₀ |
|---|---|---|
| 12.9~13.0 | 6.9~6.8 | 50~100 |
| 14.9~15.0 | 6.0~5.9 | 1~30 |
| 19.8~19.9 | 4.5~4.4 | 5~30 |
| 20.4~20.5 | 4.4~4.3 | 1~5 |
| 23.6~23.7 | 3.8~3.7 | 1~5 |
| 25.9~26.0 | 3.5~3.4 | 5~10 |
| 27.0~27.1 | 3.3~3.2 | 1~5 |
| 28.7~28.8 | 3.2~3.1 | 1~20 |
| 29.1~29.2 | 3.1~3.0 | 5~10 |

TABLE 1-continued

| 2θ | D | 100 × I/I₀ |
|---|---|---|
| 30.0~30.1 | 3.00~2.90 | 55~100 |
| 33.2~33.3 | 2.70~2.65 | 1~5 |
| 34.2~34.3 | 2.65~2.60 | 1~20 |
| 35.3~35.4 | 2.55~2.50 | 5~20 |
| 35.4~35.5 | 2.55~2.50 | 5~20 |
| 37.0~37.1 | 2.45~2.40 | 1~5 |
| 41.5~41.6 | 2.20~2.15 | 0~5 |
| 42.2~42.3 | 2.15~2.10 | 1~5 |
| 43.4~43.5 | 2.10~2.05 | 0~5 |
| 44.4~44.5 | 2.05~2.00 | 1~5 |
| 46.6~46.7 | 1.95~1.90 | 0~5 | wherein θ, d and I indicate Bragg angle, lattice distance, and x-ray diffraction peak intensity, respectively.

In the present invention, the gallosilicate PST-1 zeolite has a framework Si/Ga ratio of 1.2~1.3, indicating that the content of the positive trivalent element in the zeolite is significantly higher than those in existing zeolites having the natrolite structure. The gallosilicate PST-1 zeolite is completely dehydrated even when it is heat-treated at very low temperatures (60° C. in a vacuum, and 175° C. in air), thus showing a decrease in volume of about 16%. When it is exposed to air for about 30 minutes, it includes uniform pores having a size of about 3.0 Å, because it has a reversible water (H₂O) adsorption capacity of about 7 wt %. Also, the PST-1 zeolite can stably maintain its structure up to a high temperature of at least 800° C. despites its high gallium content, and thus it is useful not only as an ion exchanger, but also as an adsorbent for selectively separating small gaseous molecules such as hydrogen from gas mixtures.

All powder X-ray diffraction data, including the powder X-ray diffraction patterns, which are described in the present invention, were measured by a standard X-ray diffraction method using copper Kα radiation as a radiation source with an X-ray tube operating 30 kV and 40 mA. The X-ray diffraction peak was measured on a compressed powder sample at a speed of 5° (2θ) per minute, and d and I were calculated from the 2θ value and peak height of the observed X-ray diffraction peak.

In the present invention, the PST-1 zeolite preferably has X-ray diffraction patterns shown in Table 2 below.

TABLE 2

| 2θ | D | 100 × I/I₀ |
|---|---|---|
| 12.9~13.0 | 6.9~6.8 | 100 |
| 19.8~19.9 | 4.5~4.4 | 5~10 |
| 20.4~20.5 | 4.4~4.3 | 1~5 |
| 25.9~26.0 | 3.5~3.4 | 10~15 |
| 29.1~29.2 | 3.1~3.0 | 5~10 |
| 30.0~30.1 | 3.00~2.90 | 55~60 |
| 34.2~34.3 | 2.65~2.60 | 1~5 |
| 35.3~35.4 | 2.55~2.50 | 5~10 |
| 35.4~35.5 | 2.55~2.50 | 10~15 |
| 37.0~37.1 | 2.45~2.40 | 1~5 |
| 44.4~44.5 | 2.05~2.00 | 1~5 |

In an embodiment of the present invention, the PST-1 zeolite is preferably obtained by heating a compound represented by the following formula (2) at a temperature of 100~200° C. for 0.5~10 days:

$$xK_2O : yGa_2O_3 : 10.0SiO_2 : zH_2O \quad (2)$$

wherein x=5~12 moles, y=0.5~5.0 moles, and z=60~300 moles.

In an embodiment of the present invention, the compound of formula (2) may be prepared by adding potassium hydroxide (KOH) aqueous solution to gallium oxide ($Ga_2O_3$) at a ratio of 5~12 moles (calculated as oxide ($K_2O$)) relative to 0.5~5.0 moles of gallium oxide ($Ga_2O_3$), dissolving the mixture at a temperature of 100±10° C., adding a colloidal silica sol or amorphous silica slowly thereto over 5~10 minutes at a ratio of 10 moles relative to 0.5~2.0 moles of the gallium oxide, and stirring the resulting mixture for 4~48 hours.

The prepared compound of formula (2) is transferred into a Teflon reactor which is then placed in a stainless steel container in which the compound is then heated at 100~200° C. for 0.5~10 days, thus preparing the gallosilicate PST-1 zeolite of the present invention.

In a preferred embodiment of the present invention, when the compound of formula (2) has the composition shown in the following formula (3), the synthesis of a pure PST-1 zeolite is easily achieved by heating the compound at 150° C. for 0.5~3 days:

$$8.0K_2O:1.0~2.0Ga_2O_3:10.0SiO_2:100~200H_2O \quad (3)$$

In other embodiments of the present invention, the natrolite-based zeolite is a TNU-3 (Taejon University Number 3) or TNU-4 (Taejon University Number 4) gallosilicate zeolite described in the present inventor's paper "Chem. Mater., 2000, Vol. 12, pp. 2292; and J. Am. Chem. Soc., 2004, Vol. 126, pp. 13742".

In the present invention, the TNU-3 and TNU-4 zeolites are natrolite-based zeolites having a framework Si/Ga ratio slightly higher than 1.5 and have excellent ability to selectively exchange monovalent or divalent ions, a reversible steam adsorption capacity of 7.0 wt % or more at room temperature, and high thermal stability (maintaining its framework structure even at a high temperature of 500° C. or higher). In addition, these zeolites can be used as alkylation and isomerization catalysts for hydrocarbons and have excellent denitrification activity. For the methods for synthesizing TNU-3 and TNU-4 zeolites and the characteristics of these zeolites, reference is made to the present inventor's paper.

In the present invention, the natrolite-based silicate zeolite is preferably used after it has been dehydrated in order to promote selective adsorption. This dehydration process is generally performed by heating the zeolite at a temperature of 170° C. or higher for a predetermined time in the presence of inert gas. As used herein, the term "inert gas" means a gas that causes no change in the lattice structure or cations of the zeolite during the high-temperature heating of the zeolite. Typical examples of inert gas include helium, nitrogen and argon.

The dehydrated PST-1 zeolite can show X-ray diffraction patterns shown in Table 3 below.

TABLE 3

| 2θ | d | 100 × I/I₀ |
|---|---|---|
| 13.8 | 6.40 | 83 |
| 15.0 | 5.91 | 26 |
| 19.6 | 4.52 | 7 |
| 20.5 | 4.32 | 32 |
| 22.1 | 4.02 | 45 |
| 28.1 | 3.17 | 14 |
| 28.8 | 1.30 | 100 |
| 30.5 | 2.93 | 29 |
| 32.2 | 2.78 | 82 |
| 35.2 | 2.55 | 18 |
| 38.0 | 2.37 | 14 |
| 39.3 | 2.29 | 26 |
| 39.4 | 2.29 | 16 |
| 41.7 | 2.27 | 9 |
| 42.1 | 2.14 | 13 |

TABLE 3-continued

| 2θ | d | 100 × I/I₀ |
|---|---|---|
| 45.8 | 1.98 | 12 |
| 48.9 | 1.86 | 6 |

In Table 3 above, θ, d and I indicate Bragg angle, lattice distance, and X-ray diffraction peak intensity, respectively. All powder X-ray diffraction data, including the powder X-ray diffraction patterns, which are described in the present invention, were measured by a standard X-ray diffraction method using copper Kα radiation as a radiation source with an X-ray tube operating 30 kV and 40 mA. The X-ray diffraction peak was measured on a compressed powder sample at a speed of 5° (2θ) per minute, and d and I were calculated from the 2θ value and peak height of the observed X-ray diffraction peak.

The structure of the dehydrated PST-1 zeolite, determined by the above-described X-ray diffraction data, is shown in FIG. 1. The dehydrated PST-1 zeolite contains uniform pores having a size smaller than 2.0 Å, so that it does not adsorb large gaseous molecules such as argon or carbon dioxide, but it has a very flexible structure so that it has the property of adsorbing only small gaseous molecules, particularly hydrogen.

The TNU-3 zeolite and the TNU-4 zeolite can be completely dehydrated by heating them at a temperature of 300° C. for a predetermined time in the presence of inert gas. The results of X-ray diffraction measurement of the dehydrated TNU-3 zeolite and TNU-4 zeolite are shown in Tables 4 and 5, respectively.

TABLE 4

| 2θ | d | 100 × I/I₀ |
|---|---|---|
| 13.4 | 6.61 | 60 |
| 14.9 | 5.96 | 100 |
| 19.0 | 4.68 | 17 |
| 20.0 | 4.42 | 66 |
| 21.2 | 4.18 | 21 |
| 27.0 | 3.30 | 4 |
| 27.7 | 3.21 | 35 |
| 28.4 | 3.15 | 22 |
| 30.0 | 2.98 | 32 |
| 30.9 | 2.89 | 87 |
| 34.4 | 2.61 | 20 |
| 36.5 | 2.46 | 15 |
| 39.7 | 2.27 | 3 |
| 40.7 | 2.21 | 12 |
| 43.4 | 2.08 | 2 |
| 45.6 | 1.99 | 3 |
| 47.8 | 1.90 | 5 |

TABLE 5

| 2θ | d | 100 × I/I₀ |
|---|---|---|
| 13.5 | 6.55 | 15 |
| 15.0 | 5.91 | 100 |
| 19.4 | 4.58 | 8 |
| 20.1 | 4.42 | 19 |
| 20.3 | 4.39 | 19 |
| 21.6 | 4.12 | 12 |
| 27.6 | 3.23 | 23 |
| 28.2 | 3.17 | 8 |
| 28.6 | 2.12 | 19 |
| 30.1 | 2.97 | 30 |
| 30.9 | 2.89 | 28 |
| 31.3 | 2.86 | 28 |
| 34.4 | 2.61 | 11 |

TABLE 5-continued

| 2θ | d | 100 × I/I₀ |
|---|---|---|
| 34.7 | 2.59 | 6 |
| 36.3 | 2.47 | 6 |
| 37.1 | 2.42 | 7 |
| 41.2 | 2.19 | 14 |
| 48.2 | 1.89 | 5 |
| 49.3 | 1.85 | 4 |

In one aspect, the present invention provides the use of the natrolite-based zeolite as an adsorbent for selectively adsorbing hydrogen and/or helium.

In another aspect, the present invention provides an adsorbent comprising the natrolite-based zeolite.

In still another aspect, the present invention provides a process of separating a gas mixture into components using the natrolite-based zeolite. The process of separating the gas mixture according to the present invention is characterized in that a gas mixture, such as a gas mixture containing hydrogen and/or helium gas, a gas mixture consisting of hydrogen and carbon dioxide, a gas mixture consisting of hydrogen and argon, or a gas mixture consisting of helium and argon, is brought into contact with the natrolite-based zeolite, thus separating the gas mixture into components.

In an embodiment of the present invention, the separation of a gas mixture into components comprises a process of extracting a non-adsorbed component, and a process of recovering a component adsorbed onto the zeolite material. In an embodiment of the present invention, the recovered component is hydrogen and/or helium, and is hydrogen in the case of separation from a hydrogen/helium mixture.

The natrolite-based zeolite of the present invention shows a faster diffusion rate for a component, which is preferentially adsorbed, than a component which is not preferentially adsorbed. The component that is recovered may be either the component which is preferentially adsorbed or the component which is not preferentially adsorbed.

In the present invention, the gas adsorption on the zeolite can be performed in the temperature range from −100 to 800° C., preferably from −50 to 500° C., more preferably from 0 to 300° C., and most preferably at room temperature.

In the present invention, the process of separating gas by adsorption may be used in pressure swing adsorption (PSA), multi-stage pressure swing adsorption, single-stage membrane separation, multi-stage membrane separation and fluidized-bed systems.

Advantageous Effects

According to the present invention, a gallosilicate zeolite having the natrolite structure is synthesized which rapidly adsorbs hydrogen at room temperature so as to separate hydrogen gas from gaseous molecules such as argon or carbon dioxide, which are slightly larger than hydrogen gas. The use of such properties of the zeolite makes it possible to develop a more economical process for producing high-purity hydrogen.

According to the present invention, the property of the natrolite-based zeolite that selectively adsorbs hydrogen or helium was found. Also, a process of separating hydrogen and/or helium from a gas mixture by selective adsorption using the natrolite-based zeolite is provided.

The process for separating hydrogen and/or helium according to the present invention can be performed at low temperature, indicating that it can be operated in a cost-effective manner.

According to the present invention, a novel natrolite-based zeolite capable of adsorbing small molecules such as hydrogen is provided.

BRIEF DESCRIPTION OF DRAWINGS

In FIG. 1, gray: Si and Ga, red: O, and pink: K.

BEST MODE

Example 1

Preparation of PST-1 zeolite

Figure 1:
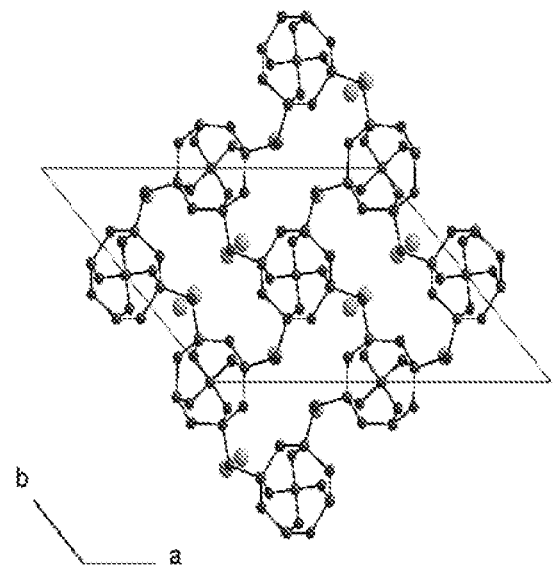
FIG. 1 shows the structure of a dehydrated PST-1 zeolite.

In a plastic beaker, 22.2 g of 45 wt % potassium hydroxide (KOH) aqueous solution was added to 6.21 g of water and stirred for 5 minutes, and then 2.08 g of gallium oxide ($Ga_2O_3$) was added thereto, and the mixture was heated at 100° C. for 12 hours. The obtained transparent solution was cooled slowly to room temperature, and 16.7 g of colloidal silica sol (Ludox AS-40) was added slowly thereto, and then the mixture was stirred for 24 hours, thereby obtaining a reaction mixture having the composition shown in the following formula (4). Then, the obtained reaction mixture was transferred into a Teflon reactor which was then placed in a stainless steel container in which the reaction mixture was then heated at 150° C. for 3 days while it was rotated at 60 revolutions per minute. Then, the obtained solid product was washed repeatedly with water and dried at room temperature.

$$8.0K_2O:1.0Ga_2O_3:10.0SiO_2:150H_2O \qquad (4)$$

The solid powder obtained in Example 1 was subjected to X-ray diffraction measurement, and the results of the measurement are shown in Table 6 below.

TABLE 6

| 2θ | d | 100 × I/I₀ |
|---|---|---|
| 12.9 | 6.9 | 100 |
| 15.0 | 5.9 | 3 |
| 19.8 | 4.4 | 5 |
| 20.4 | 4.3 | 3 |
| 23.7 | 3.8 | 1 |
| 25.9 | 3.4 | 13 |
| 27.1 | 3.3 | 2 |
| 28.7 | 3.10 | 2 |
| 29.1 | 3.05 | 9 |
| 30.1 | 2.95 | 59 |
| 33.2 | 2.70 | 2 |
| 34.2 | 2.60 | 4 |
| 35.3 | 2.50 | 8 |
| 35.4 | 2.40 | 10 |
| 37.0 | 2.30 | 2 |
| 39.0 | 2.15 | 0.4 |
| 41.5 | 2.10 | 0.5 |
| 42.2 | 2.05 | 1.26 |
| 43.4 | 2.05 | 0.75 |
| 44.4 | 2.00 | 1.89 |
| 46.7 | 1.95 | 0.80 |

In order to examine the composition of the sample obtained in Example 1, the sample was subjected to elemental analysis, and the results of the analysis are shown in the following formula (5):

$$1.0K_2O:1.0Ga_2O_3:2.56SiO_2:1.26H_2O \quad (5)$$

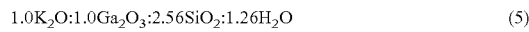

Example 2

Preparation of PST-1 Zeolite

In a plastic beaker, 22.2 g of 45 wt % potassium hydroxide (KOH) aqueous solution was added to 6.21 g of water and stirred for 5 minutes, and then 4.17 g of gallium oxide (Ga₂O₃) was added thereto, and the mixture was heated at 100° C. for 12 hours. The obtained transparent solution was cooled slowly to room temperature, and 16.7 g of colloidal silica sol (Ludox AS-40) was added slowly thereto, and then the mixture was stirred for 24 hours, thereby obtaining a reaction mixture having the composition shown in the following formula (6). Then, the obtained reaction mixture was transferred into a Teflon reactor which was then placed in a stainless steel container in which the reaction mixture was then heated at 150° C. for 1 day while it was rotated at 60 revolutions per minute. Then, the obtained solid product was washed repeatedly with water and dried at room temperature.

$$8.0K_2O:2.0Ga_2O_3:10.0SiO_2:150H_2O \quad (6)$$

The solid powder obtained in Example 1 was subjected to X-ray diffraction measurement, and the results of the measurement are shown in Table 7 below.

TABLE 7

| 2θ | d | 100 × I/I₀ |
|---|---|---|
| 12.9 | 6.9 | 57 |
| 15.0 | 5.9 | 29 |
| 19.8 | 4.4 | 20 |
| 20.4 | 4.3 | 2 |
| 23.7 | 3.8 | 2 |
| 25.9 | 3.4 | 5 |
| 27.0 | 3.3 | 5 |
| 28.6 | 3.10 | 16 |
| 29.0 | 3.05 | 6 |
| 30.1 | 2.95 | 100 |
| 33.2 | 2.70 | 1 |

TABLE 7-continued

| 2θ | d | 100 × I/I₀ |
|---|---|---|
| 34.2 | 2.60 | 20 |
| 35.3 | 2.50 | 12 |
| 35.4 | 2.40 | 16 |
| 37.0 | 2.30 | 2 |
| 39.0 | 2.15 | 2 |
| 41.7 | 2.10 | 0.5 |
| 42.2 | 2.05 | 1 |
| 43.3 | 2.05 | 3 |
| 43.8 | 2.05 | 3 |
| 44.4 | 2.00 | 2 |
| 45.8 | 2.00 | 2 |

In order to examine the composition of the sample obtained in Example 2, the sample was subjected to elemental analysis, and the results of the analysis are shown in the following formula (7):

$$1.0K_2O:1.0Ga_2O_3:2.43SiO_2:1.20H_2O \quad (7)$$

Example 3

Preparation of PST-1 Zeolite

In a plastic beaker, 36.27 g of 45 wt % potassium hydroxide (KOH) aqueous solution was added to 10.16 g of water and stirred for 5 minutes, and then 6.82 g of gallium oxide (Ga₂O₃) was added thereto, and the mixture was heated at 100° C. for 12 hours. The obtained transparent solution was cooled to room temperature, and 27.3 g of colloidal silica sol (Ludox AS-40) was added slowly thereto, and then the mixture was stirred for 24 hours, thereby obtaining a reaction mixture having the composition shown in the following formula (8). Then, the obtained reaction mixture was transferred into a Teflon reactor which was then placed in a stainless steel container in which the reaction mixture was then heated at 150° C. for 1 day. Then, the obtained solid product was washed repeatedly with water and dried at room temperature.

$$8.0K_2O:2.0Ga_2O_3:10.0SiO_2:150H_2O \quad (8)$$

Example 4

Preparation of TNU-3 Zeolite

In a plastic beaker, 38.40 g of 50 wt % sodium hydroxide (NaOH) aqueous solution was added to 48.48 g of water and stirred for 5 minutes, and then 7.50 g of gallium oxide (Ga₂O₃) was added thereto, and the mixture was heated at 100° C. for 12 hours. The obtained transparent solution was cooled to room temperature, and 60.00 g of colloidal silica sol (Ludox AS-40) was added slowly thereto, and then the mixture was stirred for 24 hours, thereby obtaining a reaction mixture having the composition shown in the following formula (9). Then, the obtained reaction mixture was transferred into a Teflon reactor which was then placed in a stainless steel container in which the reaction mixture was then heated at 100° C. for 3 days. Then, the obtained solid product was washed repeatedly with water and dried at room temperature.

$$6.0Na_2O:1.0Ga_2O_3:10.0SiO_2:150H_2O \quad (9)$$

Example 5

Preparation of TNU-4 Zeolite

In a plastic beaker, 38.40 g of 50 wt % sodium hydroxide (NaOH) aqueous solution was added to 48.48 g of water and stirred for 5 minutes, and then 7.50 g of gallium oxide ($Ga_2O_3$) was added thereto, and the mixture was heated at 100° C. for 12 hours. The obtained transparent solution was cooled to room temperature, and 60.00 g of colloidal silica sol (Ludox AS-40) was added slowly thereto, and then the mixture was stirred for 24 hours, thereby obtaining a reaction mixture having the composition shown in the formula (9). Then, the obtained reaction mixture was transferred into a Teflon reactor which was then placed in a stainless steel container in which the reaction mixture was then heated at 200° C. for 14 days. Then, the obtained solid product was washed repeatedly with water and dried at room temperature.

Example 6

Figure 2:
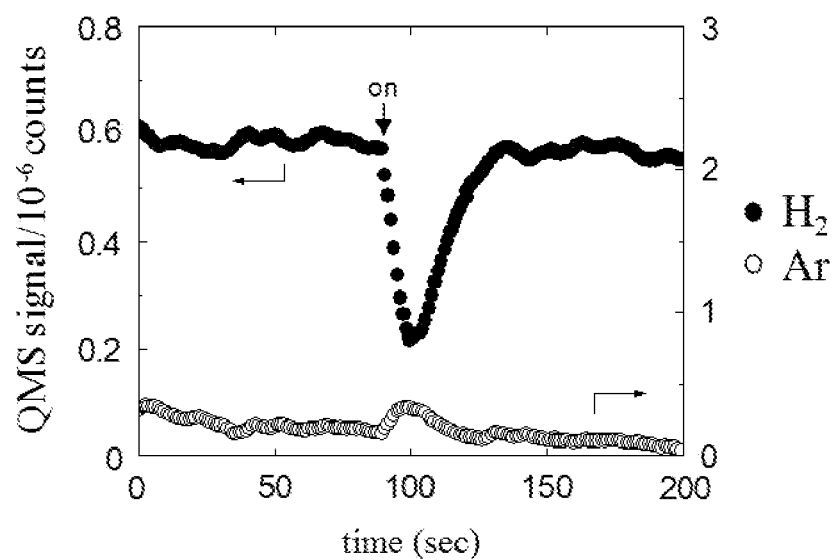
FIG. 2 shows the amounts of gases as a function of time when a PST-1 zeolite treated according to Example 4 of the present invention was used to separate hydrogen from argon at 30° C.

160.8 mg of the PST-1 zeolite prepared in Example 3 was charged into a fixed-bed microreactor having an inner diameter of 0.64 cm. The content of the reactor was heated at 450° C. at an argon flow rate of 50 cc/min for 1 hour, so that the sample was completely dehydrated. The dehydrated material was cooled to room temperature under an argon stream. The amount of the dehydrated PST-1, measured at room temperature, was 150.0 mg. Then, a mixed gas of hydrogen and argon was allowed to flow into the reactor at a flow rate of 100 cc/min and a gaseous hourly space velocity (GHSV) of 26500/hour. The mixed gas was a 4:96 (v/v) mixture of hydrogen and argon. The amount of gas passed through the reactor was analyzed using a Hiden Analytical HPR20 mass spectrometer. The selective hydrogen adsorption by the PST-1 zeolite is shown in FIG. 2. As can be seen therein, the PST-1 zeolite selectively adsorbed only hydrogen gas without adsorbing argon gas.

Example 7

Figure 3:
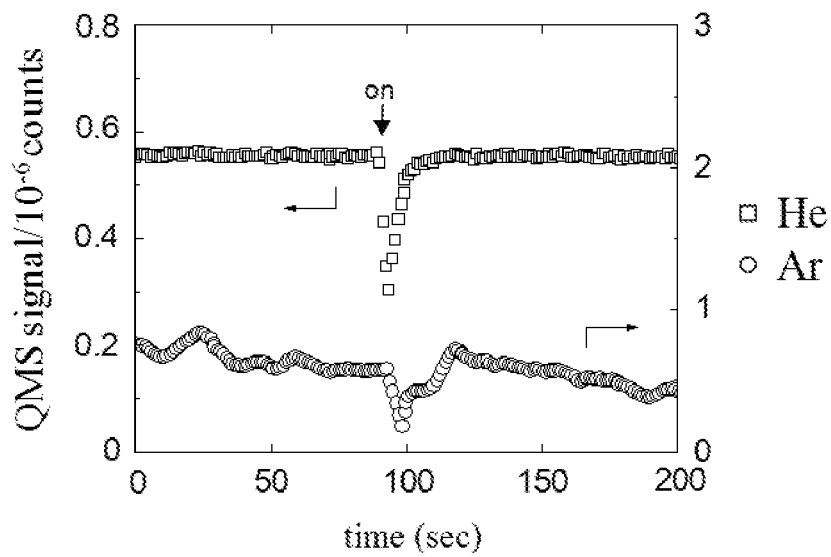
FIG. 3 shows the amounts of gases as a function of time when a PST-1 zeolite treated according to Example 5 of the present invention was used to separate helium from argon at 30° C.

160.8 mg of the PST-1 zeolite prepared in Example 3 was charged into a fixed-bed microreactor having an inner diameter of 0.64 cm. The content of the reactor was heated at 450° C. at an argon flow rate of 50 cc/min for 1 hour, so that the sample was completely dehydrated. The dehydrated material was cooled to room temperature under an argon stream. Then, a mixed gas of helium and argon was allowed to flow into the reactor at a flow rate of 100 cc/min and a gaseous hourly space velocity (GHSV) of 26500/hour. The mixed gas was a 4:96 (v/v) mixture of helium and argon. The amount of gas passed through the reactor was analyzed using a Hiden Analytical HPR20 mass spectrometer. The adsorption of helium gas by the PST-1 zeolite is shown in FIG. 3. As can be seen therein, the PST-1 zeolite selectively adsorbed only helium gas having a size smaller than hydrogen gas without adsorbing argon gas.

Example 8

Figure 4:
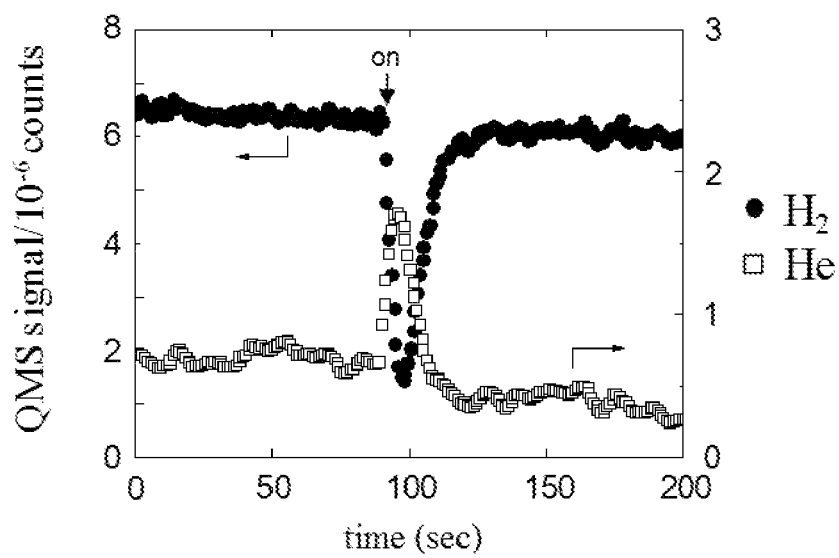
FIG. 4 shows the amounts of gases as a function of time when a PST-1 zeolite treated according to Example 6 of the present invention was used to separate hydrogen from helium at 30° C.

160.8 mg of the PST-1 zeolite prepared in Example 3 was charged into a fixed-bed microreactor having an inner diameter of 0.64 cm. The content of the reactor was heated at 450° C. at an argon flow rate of 50 cc/min for 1 hour, so that the sample was completely dehydrated. The dehydrated material was cooled to room temperature under an argon stream. Then, a mixed gas of hydrogen and helium was allowed to flow into the reactor at a flow rate of 100 cc/min and a gaseous hourly space velocity (GHSV) of 26500/hour. The mixed gas was a 4:96 (v/v) mixture of hydrogen and helium. The amount of gas passed through the reactor was analyzed using a Hiden Analytical HPR20 mass spectrometer. The adsorption of hydrogen gas by the PST-1 zeolite is shown in FIG. 4. As can be seen therein, the PST-1 zeolite more selectively adsorbed hydrogen gas than helium gas having a smaller size.

Example 9

Figure 5:
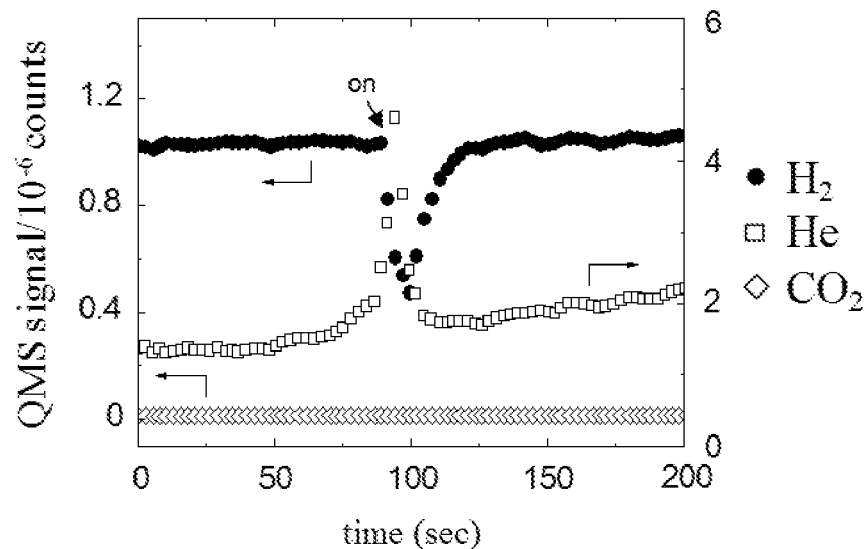
FIG. 5 shows the amounts of gases as a function of time when a PST-1 zeolite treated according to Example 7 of the present invention was used to separate hydrogen, carbon dioxide and helium from each other at 30° C.

160.8 mg of the PST-1 zeolite prepared in Example 3 was charged into a fixed-bed microreactor having an inner diameter of 0.64 cm. The content of the reactor was heated at 450° C. at an argon flow rate of 50 cc/min for 1 hour, so that the sample was completely dehydrated. The dehydrated material was cooled to room temperature under an argon stream. Then, a mixed gas of hydrogen, carbon dioxide and helium was allowed to flow into the reactor at a flow rate of 100 cc/min and a gaseous hourly space velocity (GHSV) of 26500/hour. The mixed gas was a 4:4:96 (v/v/v) mixture of hydrogen, carbon dioxide and helium. The amount of gas passed through the reactor was analyzed using a Hiden Analytical HPR20 mass spectrometer. The selective adsorption of hydrogen gas by the PST-1 zeolite is shown in FIG. 5. As can be seen therein, the PST-1 zeolite more selectively adsorbed hydrogen gas than helium gas without adsorbing carbon dioxide gas.

Example 10

Figure 6:
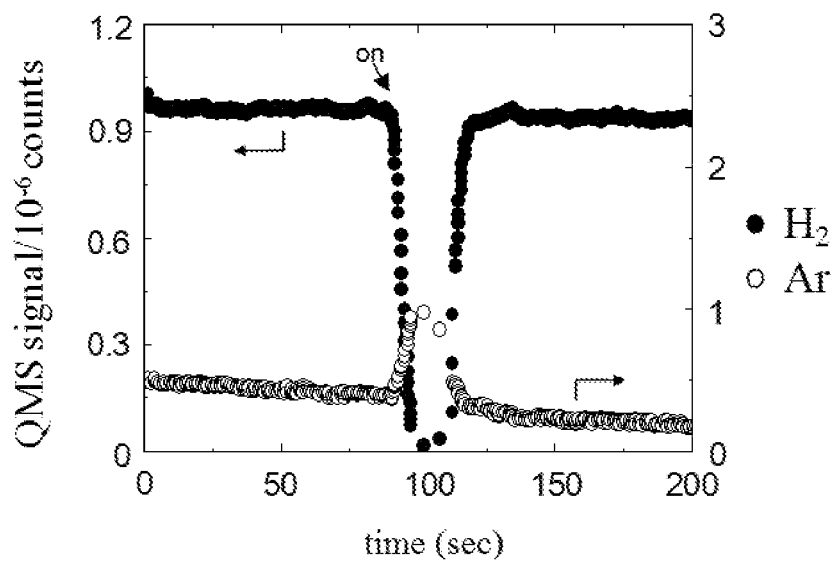
FIG. 6 shows the amounts of gases as a function of time when a PST-1 zeolite treated according to Example 8 of the present invention was used to separate hydrogen from argon at 30° C.

160.8 mg of the PST-1 zeolite prepared in Example 3 was charged into a fixed-bed microreactor having an inner diameter of 0.64 cm. The content of the reactor was heated at 450° C. at an argon flow rate of 50 cc/min for 1 hour, so that the sample was completely dehydrated. The dehydrated material was cooled to room temperature under an argon stream. Then, a mixed gas of hydrogen and argon was allowed to flow into the reactor at a flow rate of 50 cc/min and a gaseous hourly space velocity (GHSV) of 13250/hour. The mixed gas was a 4:96 (v/v) mixture of hydrogen and argon. The amount of gas passed through the reactor was analyzed using a Hiden Analytical HPR20 mass spectrometer. The selective adsorption of hydrogen gas by the PST-1 zeolite, measured when the flow rate of the mixed gas was reduced to 50 cc/min, is shown in FIG. 6. As can be seen therein, the time of adsorption of hydrogen gas increased.

Example 11

Figure 7:
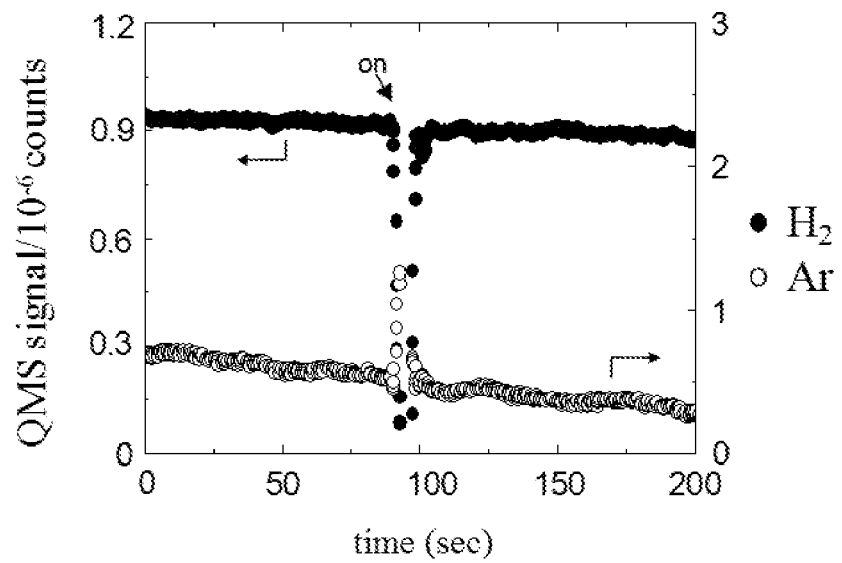
FIG. 7 shows the amounts of gases as a function of time when a PST-1 zeolite treated according to Example 9 of the present invention was used to separate hydrogen from argon at 30° C.

160.8 mg of the PST-1 zeolite prepared in Example 3 was charged into a fixed-bed microreactor having an inner diameter of 0.64 cm. The content of the reactor was heated at 450° C. at an argon flow rate of 50 cc/min for 1 hour, so that the sample was completely dehydrated. The dehydrated material was cooled to room temperature under an argon stream. Then, a mixed gas of hydrogen and argon was allowed to flow into the reactor at a flow rate of 150 cc/min and a gaseous hourly space velocity (GHSV) of 13250/hour. The mixed gas was a 4:96 (v/v) mixture of hydrogen and argon. The amount of gas passed through the reactor was analyzed using a Hiden Analytical HPR20 mass spectrometer. The selective adsorption of hydrogen gas by the PST-1 zeolite, measured when the flow rate of the mixed gas was increased to 150 cc/min, is shown in FIG. 7. As can be seen therein, the PST-1 zeolite very quickly adsorbed hydrogen gas.

Example 12

Figure 8:
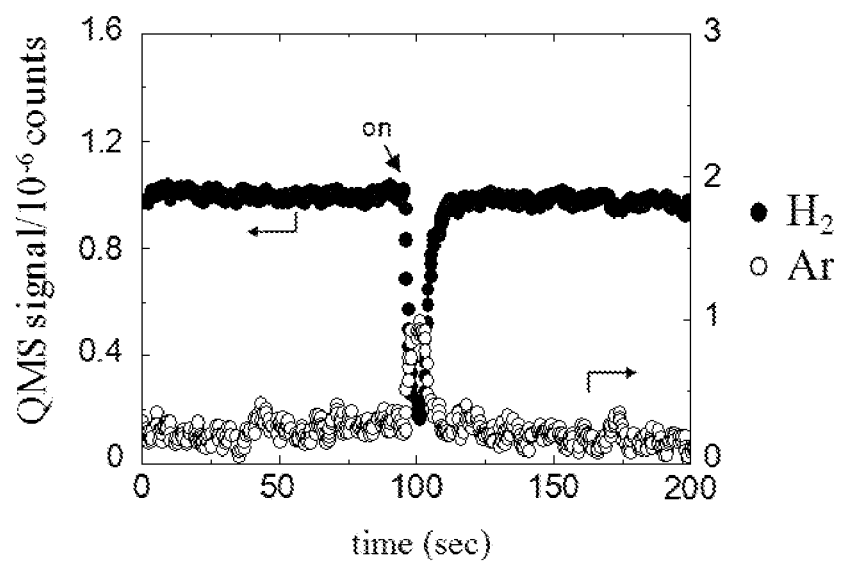
FIG. 8 shows the amounts of gases as a function of time when a TNU-3 zeolite treated according to Example 10 of the present invention was used to separate hydrogen from argon at 30° C.

500.0 mg of the TNU-3 zeolite prepared in Example 4 was charged into a fixed-bed microreactor having an inner diameter of 0.64 cm. The content of the reactor was heated at 300° C. at an argon flow rate of 100 cc/min for 1 hour, so that the sample was completely dehydrated. The dehydrated material was cooled to room temperature under an argon stream. Then, a mixed gas of hydrogen and argon was allowed to flow into the reactor at a flow rate of 100 cc/min and a gaseous hourly space velocity (GHSV) of 19500/hour. The mixed gas was a 4:96 (v/v) mixture of hydrogen and argon. The amount of gas passed through the reactor was analyzed using a Hiden Analytical HPR20 mass spectrometer. The selective adsorption of hydrogen gas by the TNU-3 zeolite is shown in FIG. 8. As can be seen therein, the TNU-3 zeolite selectively adsorbed hydrogen gas.

Example 13

Figure 9:
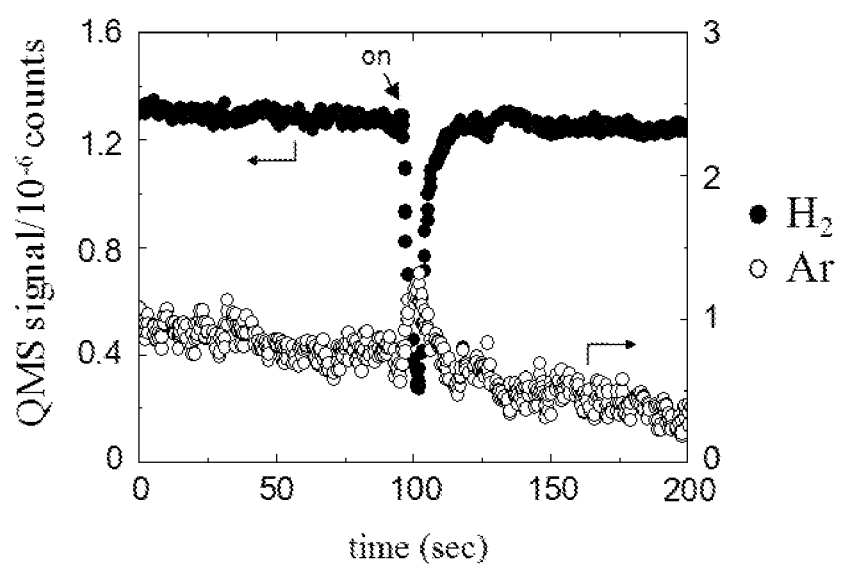
FIG. 9 shows the amounts of gases as a function of time when a TNU-4 zeolite treated according to Example 11 of the present invention was used to separate hydrogen from argon at 30° C.

500.0 mg of the TNU-4 zeolite prepared in Example 5 was charged into a fixed-bed microreactor having an inner diameter of 0.64 cm. The content of the reactor was heated at 300° C. at an argon flow rate of 100 cc/min for 1 hour, so that the sample was completely dehydrated. The dehydrated material was cooled to room temperature under an argon stream. Then, a mixed gas of hydrogen and argon was allowed to flow into the reactor at a flow rate of 100 cc/min and a gaseous hourly space velocity (GHSV) of 19500/hour. The mixed gas was a 4:96 (v/v) mixture of hydrogen and argon. The amount of gas passed through the reactor was analyzed using a Hiden Analytical HPR20 mass spectrometer. The selective adsorption of hydrogen gas by the TNU-4 zeolite is shown in FIG. 9. As can be seen therein, the TNU-4 zeolite selectively adsorbed hydrogen gas.

Example 14

Analysis of Characteristics of PST-1 Zeolite

When the solid powder obtained in Example 1 was subjected to thermal analysis, about 7 wt % of water was desorbed from the powder at a temperature of 200° C. or lower. Also, when the same sample was subjected to heating X-ray diffraction measurement, the unit lattice constant of the PST-1 zeolite at room temperature was calculated to be a=13.729 Å, c=6.572 Å. However, when the sample was heated to 60° C. in a vacuum of $10^{-3}$ Torr, the water of the PST-1 zeolite was mostly removed. The unit lattice constant calculated from the X-ray diffraction pattern measured at 100° C. was compared with the unit lattice constant at room temperature, and as a result, a decrease in unit lattice volume of 16.3% was found. In addition, it was observed that the PST-1 zeolite stably maintained its structure up to a temperature of at least 800° C. Also, when the PST-1 zeolite was cooled to room temperature and then exposed to air, it was restored to the original state within 30 minutes by adsorbing water.

The invention claimed is:

1. A process of selectively separating hydrogen or helium from a gas mixture containing hydrogen or helium, the process comprising bringing the gas mixture into contact with a natrolite-based zeolite.

2. The process of claim 1, wherein the hydrogen or helium is separated by adsorption on the natrolite-based zeolite.

3. The process of claim 1, wherein the natrolite-based zeolite is prepared using a mixture comprising a source of an alkali metal or alkaline earth metal (M), an oxide of a trivalent element (X), an oxide of a tetravalent element (Y), and water, in which the mixture has the following molar ratio composition:

$YO_2/X_2O_3 = 0.5 \sim 100$;  (i)

$H_2O/YO_2 = 1 \sim 100$; and  (ii)

$M_2O/YO_2 = 0.1 \sim 10$.  (iii)

4. The process of claim 3, wherein X comprises gallium or aluminum, and Y comprises silicon.

5. The process of claim 1, wherein the natrolite-based zeolite is a natrolite-based gallosilicate.

6. The process of claim 1, wherein the separation occurs at a temperature ranging from −100 to 800° C.

7. The process of claim 6, wherein the adsorption occurs at room temperature.

8. A process of separating hydrogen or helium from a gas mixture containing hydrogen or helium, the process comprising bringing the gas mixture into contact with a gallosilicate PST-1 zeolite consisting of oxides having a molar ratio shown in the following formula (1), the gallosilicate PST-1 zeolite being characterized by X-ray diffraction patterns including lattice distances shown in Table 11 below:

$1.0K_2O : 1.0Ga_2O_3 : 2.3\sim 2.7SiO_2$  (1)

TABLE 11

| 2θ | D | 100 × I/I₀ |
|---|---|---|
| 12.9~13.0 | 6.9~6.8 | 100 |
| 19.8~19.9 | 4.5~4.4 | 5~10 |
| 20.4~20.5 | 4.4~4.3 | 1~5 |
| 25.9~26.0 | 3.5~3.4 | 10~15 |
| 29.1~29.2 | 3.1~3.0 | 5~10 |
| 30.0~30.1 | 3.00~2.90 | 55~60 |
| 34.2~34.3 | 2.65~2.60 | 1~5 |
| 35.3~35.4 | 2.55~2.50 | 5~10 |
| 35.4~35.5 | 2.55~2.50 | 10~15 |
| 37.0~37.1 | 2.45~2.40 | 1~5 |
| 44.4~44.5 | 2.05~2.00 | 1~5 | wherein θ, d and I indicate Bragg angle, lattice distance, and x-ray diffraction peak intensity, respectively.

9. The process of claim 8, wherein the PST-1 zeolite has a lattice structure shown in Table 12 below:

TABLE 12

| 2θ | D | 100 × I/I₀ |
|---|---|---|
| 12.9~13.0 | 6.9~6.8 | 50~100 |
| 14.9~15.0 | 6.0~5.9 | 1~30 |
| 19.8~19.9 | 4.5~4.4 | 5~30 |
| 20.4~20.5 | 4.4~4.3 | 1~5 |
| 23.6~23.7 | 3.8~3.7 | 1~5 |
| 25.9~26.0 | 3.5~3.4 | 5~10 |
| 27.0~27.1 | 3.3~3.2 | 1~5 |
| 28.7~28.8 | 3.2~3.1 | 1~20 |
| 29.1~29.2 | 3.1~3.0 | 5~10 |
| 30.0~30.1 | 3.00~2.90 | 55~100 |
| 33.2~33.3 | 2.70~2.65 | 1~5 |
| 34.2~34.3 | 2.65~2.60 | 1~20 |
| 35.3~35.4 | 2.55~2.50 | 5~20 |
| 35.4~35.5 | 2.55~2.50 | 5~20 |
| 37.0~37.1 | 2.45~2.40 | 1~5 |
| 41.5~41.6 | 2.20~2.15 | 0~5 |
| 42.2~42.3 | 2.15~2.10 | 1~5 |
| 43.4~43.5 | 2.10~2.05 | 0~5 |
| 44.4~44.5 | 2.05~2.00 | 1~5 |
| 46.6~46.7 | 1.95~1.90 | 0~5. |

10. The process of claim 8, wherein the PST-1 zeolite is used after dehydration.

11. A process of separating hydrogen from a gas mixture containing hydrogen, the process comprising bringing the gas mixture into contact with a TNU-3 zeolite and/or a TNU-4 zeolite.

12. The process of claim 11, wherein the TNU-3 and TNU-4 are used after dehydration.

\* \* \* \* \*